Jan. 5, 1960

M. I. DAVIDSON 2,919,838

DEVICE FOR TURNING COLLARS, CUFFS OF SHIRTS AND SIMILAR ARTICLES

Filed May 9, 1957

INVENTOR
Mats Ingvar Davidson
BY
Atty.

Jan. 5, 1960

M. I. DAVIDSON 2,919,838

DEVICE FOR TURNING COLLARS, CUFFS OF
SHIRTS AND SIMILAR ARTICLES

Filed May 9, 1957

INVENTOR.
Mats Ingvar Davidson
BY

Jan. 5, 1960

M. I. DAVIDSON 2,919,838

DEVICE FOR TURNING COLLARS, CUFFS OF SHIRTS AND SIMILAR ARTICLES

Filed May 9, 1957

INVENTOR
Mats Ingvar Davidson
BY
Peter U. Bouy
atty.

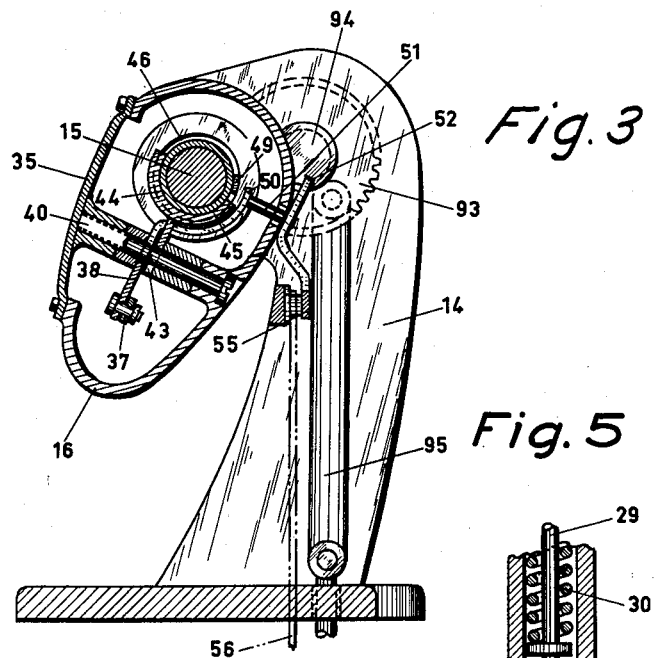
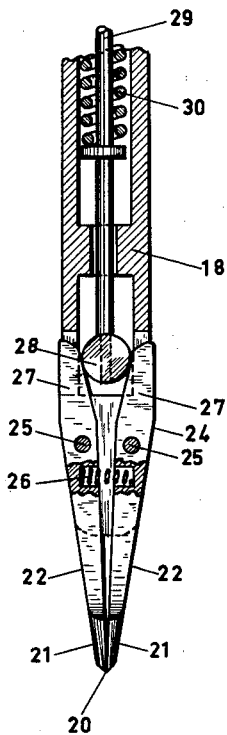
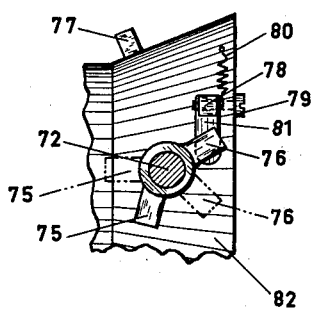

Jan. 5, 1960   M. I. DAVIDSON   2,919,838
DEVICE FOR TURNING COLLARS, CUFFS OF
SHIRTS AND SIMILAR ARTICLES
Filed May 9, 1957   7 Sheets-Sheet 6

INVENTOR.
Mats Ingvar Davidson
BY Peter M. Borcey
atty.

United States Patent Office 2,919,838
Patented Jan. 5, 1960

2,919,838

DEVICE FOR TURNING COLLARS, CUFFS OF SHIRTS AND SIMILAR ARTICLES

Mats Ingvar Davidson, Ganghester, Sweden

Application May 9, 1957, Serial No. 658,480

1 Claim. (Cl. 223—2)

It is important when turning the inside out of collars, cuffs of shirts and similar articles which comprise two pieces of fabric interconnected along their edges that the corners of the articles are made smooth and that said edges end in a point. In order to prevent a crowding of the fabric at said point, it was formerly necessary to cut off the material outside the edge-stitch at the corners. The turning was then performed in such a way that the corners of the cuff were put over a mandrel, whereupon another mandrel was moved axially towards the upper end of the first-mentioned mandrel and the cuff put over the upper mandrel, the sides of the two fabrics were then turned inwards and subsequently turned outwards. As a rule an acute implement was then used for stretching out the fabric at the corner whereby a marked point is obtained. Such a way of turning cuffs is however time-wasting and often the edges will not be perfectly formed.

The present invention relates to an improved method of turning cuffs, collars of shirts and similar articles. The main features of the method are that a corner of the article in question is by means of a tweezer-like implement clamped and swung approximately 180° in a plane which substantially divides said corner in two equal angles, that the corner and the implement also are turned approximately 180° around the longitudinal axis of said implement, and that one of the pieces of fabric is then put over the implement and the other piece of fabric in such a way that the surfaces of the pieces of fabric which were first turned from each other will be turned towards each other, whereupon the implement is removed and the clothing eventually provided with an edge-stitch in the customary manner. Such a turning may be performed without cutting off the material at the corners at the outside of the edge-seam. The turning can be done very rapidly and easily and the corners will be smooth and have an equal thickness and thus be very perfectly formed.

The invention relates also to a device for the application of said method. The device comprises an arm which at one of its ends is swingably carried on an essentially horizontal shaft in the arm of said device, the other end of said arm being provided with a turnably carried, tweezer-like implement, the actuating end of said tweezer-like implement being situated on an imaginary elongation line from said horizontal shaft, said implement being further adapted to be turned approximately half a revolution when said arm is turned downwards but not until said arm is turned approximately a quarter of a revolution from its upper position. The device comprises further a mandrel over which one corner of the article is adapted to be put, said mandrel being slidable in the longitudinal direction of said implement when said arm is in its upper position, the branches of said implement being adapted to be clamped together when said arm is swung from its upper position, the parts of said implement being further adapted to be pressed apart when said arm is in its lower position.

Further details of the invention will be evident from the following description with reference had to the accompanying drawings. In the drawings:

Figure 1A shows on an enlarged scale the front portion of the device, while

Fig. 3 shows a vertical section through the device on the line III—III in Fig. 1 with its arm swung down to the position shown with unbroken lines in Fig. 2.

Fig. 4 shows on an enlarged scale a section on the line IV—IV in Fig. 1.

Fig. 5 shows on an enlarged scale an implement arranged on the outer end of said arm and turned 90° in relation to the position shown in Fig. 1.

Figure 9:
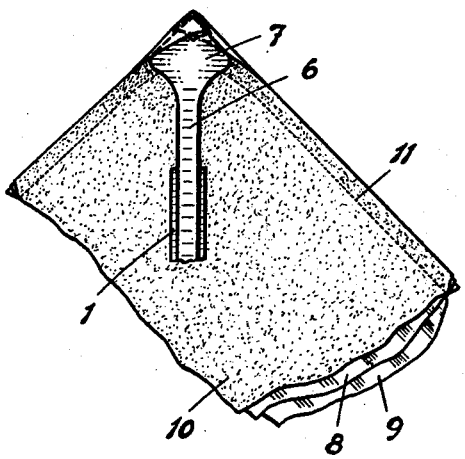

Fig. 9 a later phase of the same turning and

Figure 10:
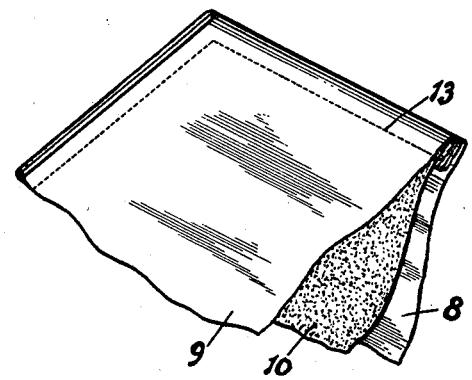

Fig. 10, finally, shows diagrammatically the corner of the cuff after the turning and when said cuff has been provided with an edge-stitch.

Figure 1:
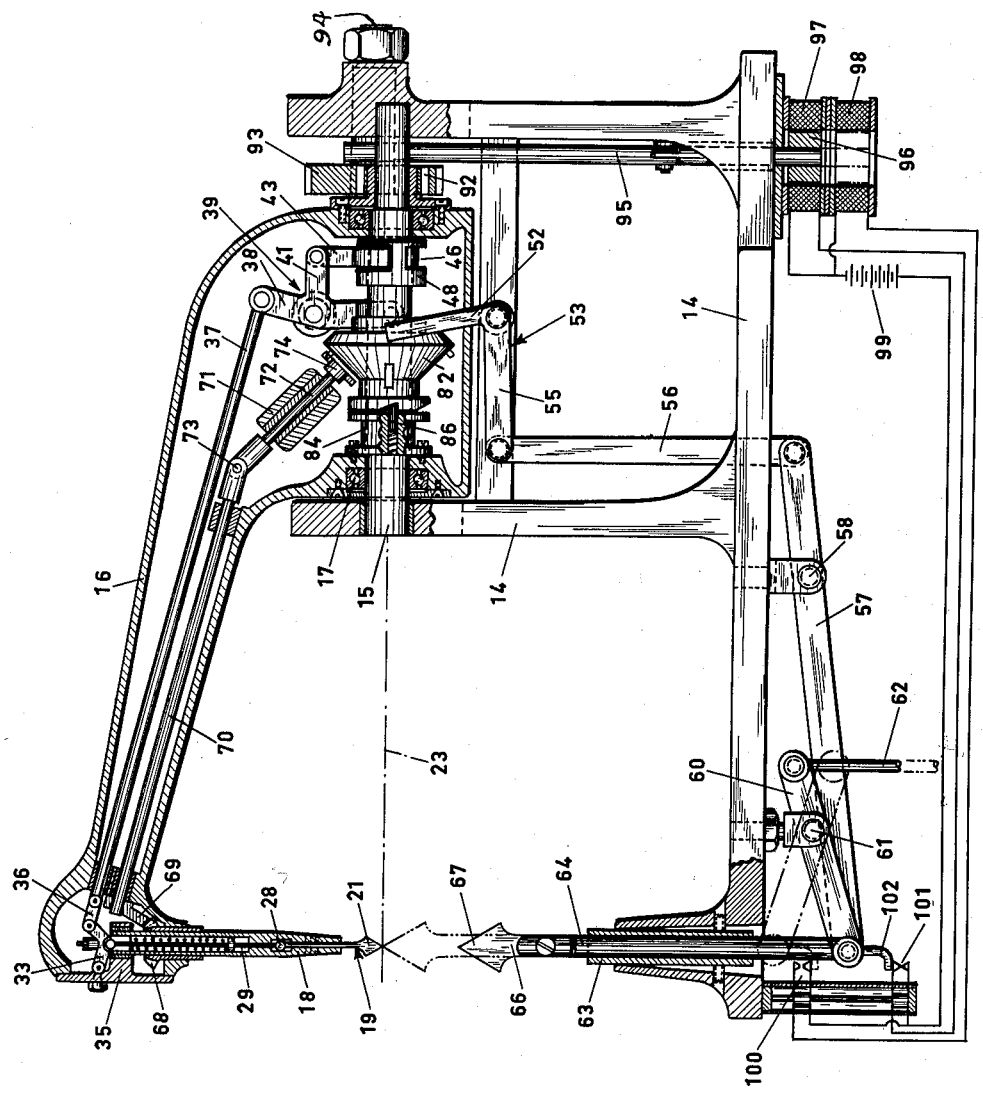
Fig. 1 shows a vertical, longitudinal section through a device according to the invention
Figure 1A:
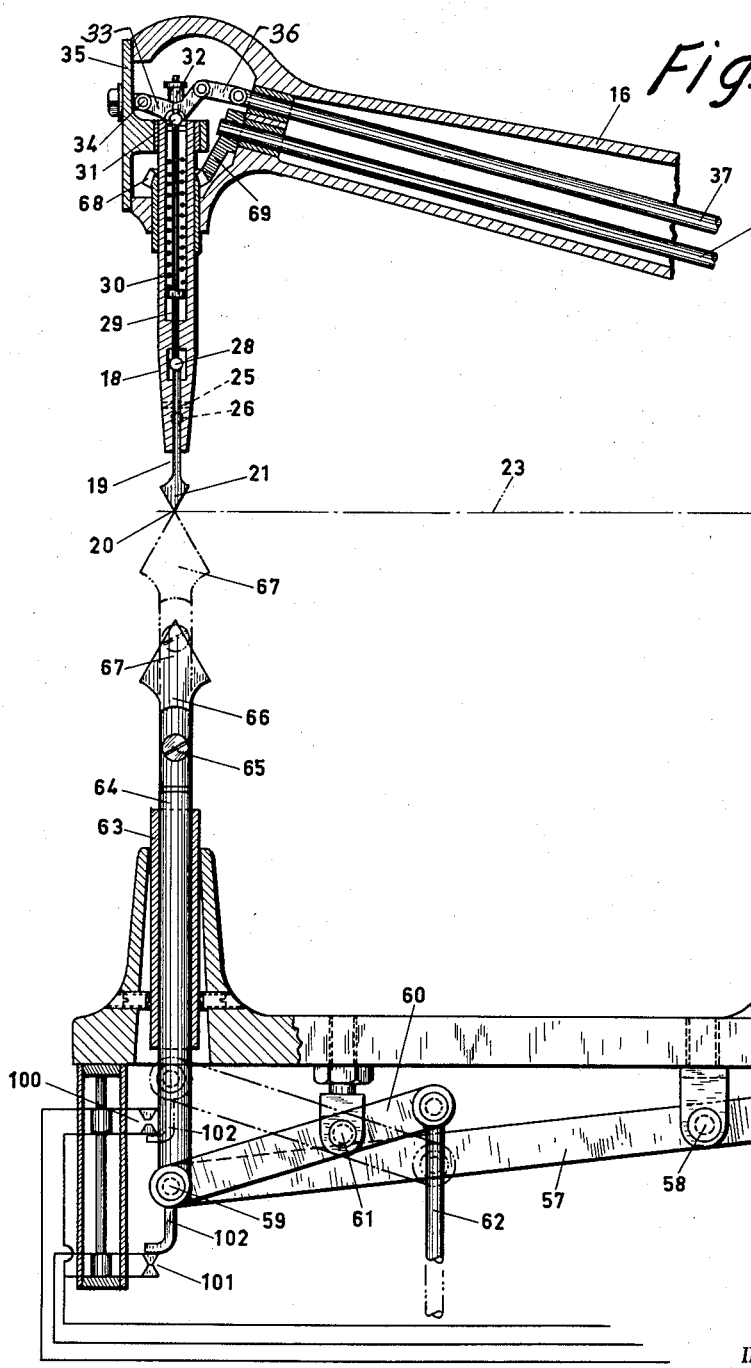
Figure 1B:
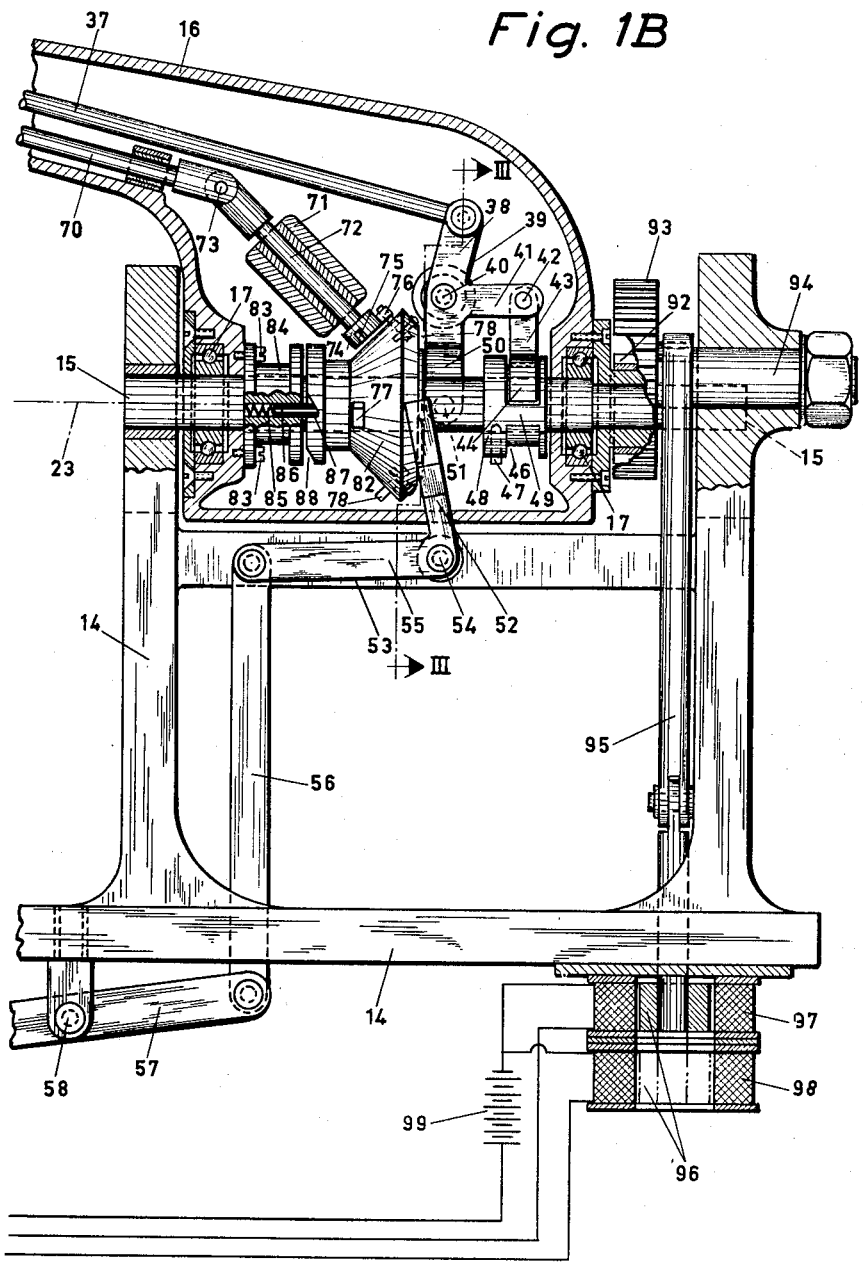
Figure 1B shows on an enlarged scale the rear portion of said device.
Figure 2:
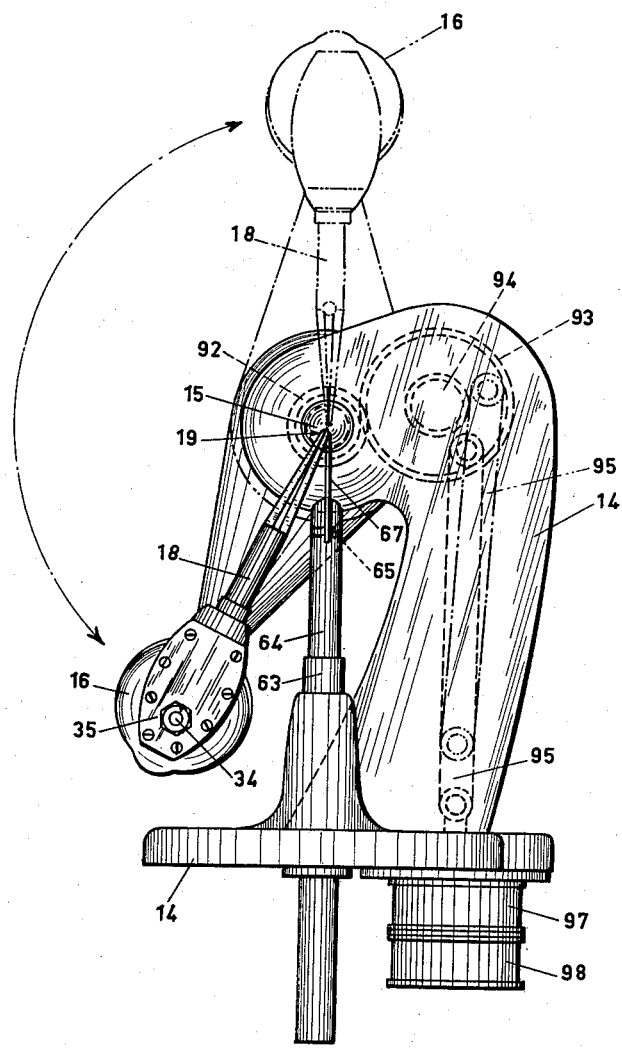
Fig. 2 is an end view of said device.
Figure 6:
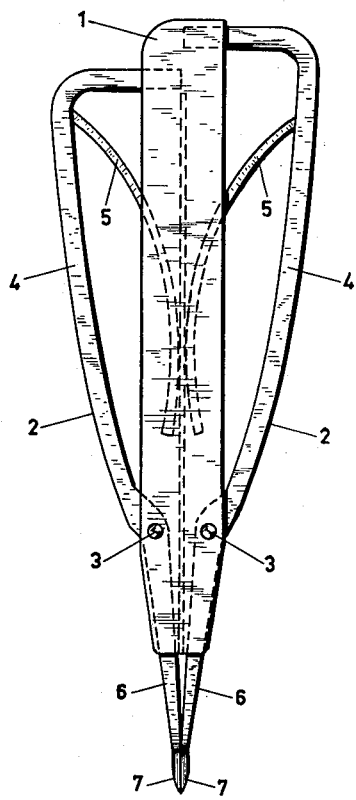
Fig. 6 is a plan view of an implement by means of which the corner can be manually turned.
Figure 7:
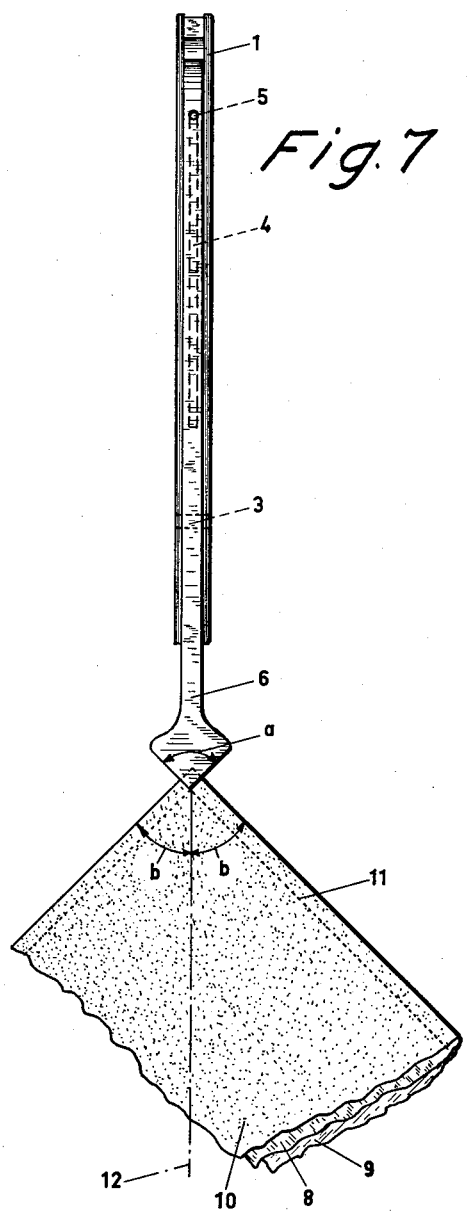
Fig. 7 is a side view of the implement with its parts clamping one corner of a cuff before the turning of the same.

In order to facilitate the description of the action of the device shown in the drawings in may be convenient to describe the implement shown in Figs. 6 and 7 first, by means of which implement the cuff is manually turned.

This implement comprises a handle frame 1 in relation to which two two-armed lever beams 2 are turnably carried around two pins 3. Springs 5 are inserted between the handle frame 1 and the parts 4 of the lever beams 2 serving as a handle, said springs forcing the free ends of parts 6 arranged opposite the lever beams 2 against each other in a tweezer-like way. The free ends 7 of the parts 6 are shaped as plates and extend in a corner having an angle a which corresponds with the angle of the corner to be turned.

Figure 8:
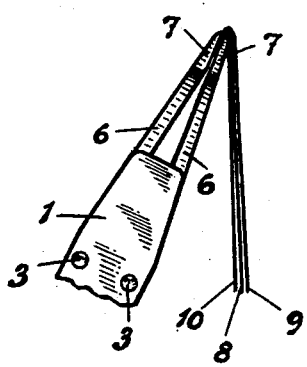
Fig. 8 shows a phase of the turning.

The cuff shown in the drawings comprises two pieces of fabric 8 and 9 having their right surfaces turned against each other and a piece of fabric 10 serving as a reinforcement. These three pieces of fabric 8, 9 and 10 are at three of their edges connected with each other by means of a seam 11. When the parts 4 have been pressed together by one hand, whereby the free ends 7 of the parts 6 are forced apart, the implement is applied on a corner of the cuff in the way shown in Fig. 7 whereupon the parts 4 are released in such a way that the ends 7 clamp opposite sides of the pieces of fabric 8, 9 at one corner. Attention must then be paid so as to apply the ends 7 exactly at the corner of the seam 11. The implement is thereupon turned perpendicularly to the plane of the drawing along a line 12 which divides the corner in two equal angles b, b (Fig. 7). The corner is in Fig. 8 shown folded after the implement has been turned almost 180° in the manner shown above. The implement is next turned almost 180° around its own longitudinal axis and brings along in this movement the fabric at the corner which after this turning has the form shown in Fig. 9. The outer piece of fabric 9 is thereupon put over the implement and over the piece of fabric 10 which after this turning will thus be situated between the pieces of fabric 8 and 9. The right surface of the pieces of fabric 8, 9 will simultaneously be turned. The implement is then taken away, i.e. when the parts 4 have been partly pushed together. The other corner of the cuff is turned in a similar way, but the implement is then turned around its longitudinal axis in the opposite direction. The cuff can eventually be provided with an edge-stitch 13.

The same operations are applied with the device shown in Figs. 1–5, whereby the turning is facilitated as the device also comprises a mandrel over which the clothing is pushed before the turning. The device will be described in detail in the following.

The stand 14 of the device is provided with a stationary, horizontal shaft 15 around which a hollow arm 16 is turnably carried by a ball bearing 17. The arm 16 is directed towards the front end of the device (i.e. the left end according to Fig. 1). An implement support 18 is rotatably carried at the front end of the arm 16, the longitudinal direction of this support 18 being perpendicular to the longitudinal direction of the shaft 15. The support 18 is provided with a tweezer-like implement 19 of almost the same type as the implement shown in Figs. 6 and 7. The point 20 of the triangle-formed ends 21 of the lower parts 22 of the implement is situated on an imaginary, elongation line 23 of the shaft 15. The parts 22 are composed of the lower end of two-armed lever beams 24 which are journalled on pins 25 carried by the implement support 18. The parts 22 are pressed apart by means of a spring 26 which is situated between the parts 22. A ball- or cylinder-shaped pressing tool 28 may be inserted from above between the upper ends 27 of the lever beams 24. The pressing tool 28 is arranged on the lower end of a bar 29 which slides axially in the support 18. The bar 29 is kept in its lower position by means of a helical spring 30, which is dimensioned in such a way that it can overcome the action of the spring 26. Two stop members 31, 32 are arranged at some distance from each other on the upper end on the bar 29, and a lever beam 33 is arranged between said stop members 31, 32 which lever beam 33 at one of its ends is journalled on a pin 34 of a closing cover 35 for the arm 16. The arm 33 is by means of a link 36 hinged on the outer end of a bar 37, the inner end of which is hinged on an arm 38 of a three-armed lever beam 39 which is journalled on a pin 40 in the arm 16. The arms of the lever beam 39, indicated by 41, is by means of a pin 42 hinged on a fork-shaped bar 43. The two branches 44, 45 of the bar 43 engage a notch 46 in a casing 48 which by means of a clamping screw 47 is fastened on the shaft 15. A stop member 49 projects into the notch 46. The third arm 50 of the lever beam 39 is provided with an outwardly directed pin 51. When the arm 16 is swung down to the position shown in Fig. 3, the free end of an arm 52 of a bell crank 53 is situated on one side of the pin 51, the crank 53 being journalled on the stand 14 by means of a pin 54. The other arm 55 of the bell crank 53 is by means of a link 56 hinged on one end of a two-armed lever beam 57 which is journalled on a pin 58 on the underside of the stand 14. The opposite end of the lever beam 57 is by means of a pin 59 hinged on another lever beam 60 which is journalled on a second pin 61 on the underside of the stand 14. The lever beam 60 is by means of its opposite end hinged on a pull rod 62 which by means of a pedal (not shown) can be pulled downwards against the action of a spring (not shown in the drawing). A vertically slidable piston 64 is by means of the pin 59 hinged on the lever beams 57 and 60, which piston 64 is situated in a guide 63 and which piston 64 at its upper end carries a plate-shaped mandrel 66. The mandrel 66 is fastened by means of a screw 65 and has a triangle-shaped upper end 67 which, when the mandrel is in use, is moved up to the imaginary line 23.

The support 18 is at its upper end provided with a conical gear wheel 68 which coacts with a toothed section 69 on a shaft 70 which is turnably carried in the arm 16. The gear ratio between the gear wheel 68 and the toothed section 69 is approximately 1:2. A second shaft 72 is turnably carried by a bearing bracket 71 in the arm 16. The shaft 72 is by means of a ball joint 73 connected with the shaft 70. A head 74 is arranged on the lower end of the shaft 72 which head 74 is provided with two substantially radially directed arms 75, 76 (see also Fig. 4). The arms 75, 76 coact alternatively, in the way described here below, with stop arms 77 and 78 which on pins 79 are swingably carried in such a way that they, against the action of a spring 80, can be swung into notches 81 in a cylinder 82 when they are acted upon from below by the arms 75, 76, said cylinder 82 being carried intermittingly turnable on the shaft 15.

A turnable cylinder 84 is by means of screws 83 carried on the shaft 15 in the interior of the arm 16. A carrier piston 86 in the cylinder 84 is movable to the right according to Fig. 1, i.e. parallel to the horizontal shaft 15, by means of the action of a helical spring 85. The outer (right) end of the piston 86 engages notches 88 which are provided with abutments 87 taken out in the left hand surface of the cylinder 82. Four different abutments 87 are arranged on the cylinder 88 with a displacement of 90° in relation to each other. A helical spring 89 is arranged in the interior of the cylinder 82 and presses a blocking piston 90 into peripheral notches 91 in the shaft 15 in order to prevent the cylinder 82 from being returned to its initial position at the end of a turning.

The rear end of the arm 16 carries a gear wheel 92 which is turnable around the shaft 15 and coacts with a gear wheel 93. The gear wheel 93 is twice as large as the gear wheel 92 and journalled on a pivot 94 on the stand 14. The gear wheel 93 is by means of a pull bar 95 hinged on an armature 96 of an electromagnet which has two coils 97 and 98. These coils are by means of cables via an electrical source 99 coupled to electrical contacts 100 and 101 which, when the piston 64 is moved up and down, are alternatively actuated by a switch 102.

When the arm 16 is in its swung-up position, the fork end 44 of the bar 43 is pressed against the stop member 49 in the notch 46. The arm 41 of the lever beam 39 is thus somewhat lifted by the bar 43 and the lever beam 39 itself thus somewhat turned in counter-clockwise direction according to Fig. 1. Further, the bar 37 has thus been moved somewhat to the left and the arm 33 has lifted the bar 29 against the action of the spring 30. The pressing tool 28 (Fig. 5) will then be in its upper position thereby permitting the spring 26 to press the parts 22 apart. The implement is consequently open. A corner of the cuff shown in Fig. 7 is put over the mandrel 66 in such a way that said mandrel will be situated between the pieces of fabric 8 and 9. The pedal is thereupon moved downwards causing the pull rod 62 to swing the lever beams 57 and 60 to the position shown with dash and dot lines in Fig. 1, whereby the mandrel 66 is lifted, together with the cuff, in such a way that the upper corner of the cuff is moved into the space between the ends 21 of the implement 19. At the end of the motion upwards of the piston 64, the contacts 100 of the switch 102 are closed and the lower coil 98 will be alive and thus attract the armature 96. The motion thereby created will turn the arm 16 in counter-clockwise direction according to Fig. 2. As soon as the fork 43 leaves the stop member 49, the spring 30 presses the bar 29 with the presssing tool 28 downwards and forces thereby the ends 21 against each other. The ends 21 will thus clamp the corner of the cuff on the outside of the seam 11. During the swinging down of the arm 16, the arm 76 of the head 74 will abut against the stop arm 78—said abutment taking place when the arm is in an approximately horizontal position—whereby the shaft 72 and the shaft 70 with the toothed section 69 will be turned to the left and cause a turning of the support 18 approximately 180° to the right. The cuff is then by hand put over the implement 19 which at this moment is in the position shown with unbroken lines in Fig. 2 and the turning of this corner is then finished. When the arm 16 is in this position, the pin 51 of the arm 50 will be situated in front of the free end of the arm 52 (see Fig. 3). By pushing on the pedal, the bell crank 53 is turned in clockwise direction according to Fig. 1, such a turning causing a counter-clockwise turning of the lever beam 39 of the arm 16. The last mentioned turning opens the implement 19 in the way described herein before. When the pedal is released, the mandrel 66 will return to its lower position (shown with unbroken lines in Fig. 1) and the cuff with its turned corner can thus be removed from the implement 19.

In the lower position of the piston 64, the switch 102 will close the two contacts 101, whereby the upper coil 97 will be alive and thus attract the armature 96. The bar 95 is then pressed upwards and forces, via the gear wheels 93 and 92, the arm 16 to return to its upper position (shown with dash and dot lines in Fig. 2). When the arm 16 is swung upwards, the cylinder 84 will bring the blocking piston 86 along in its motion, which piston 86 by engaging a notch 88 of the cylinder 82 and by abutting against the stop member 87 also brings the cylinder 82 along in this turning movement, the cylinder 82 being thereby turned 90°. When the arm passes the stop arm 78, this latter will temporarily be folded into its notch 81 against the action of the spring 80 and the arm 78 does consequently not actuate the head 74. When the said arm in this way is returned to its upper position, the opposite corner of the cuff is put over the mandrel 66 which once again is lifted by moving the pedal. The contacts 100 are once again closed and the arm 16 is thereby forced to be turned downwards again. The arm 75 will then abut against the stop arm 77 (Fig. 4) which at this very movement is situated in the motion path of the arm 75 which causes a turning of the head 74, the shaft 72, the shaft 70, and the support 18 with the implement 19 but this time in the opposite direction. The corner of the cuff now mounted on the mandrel 66 is thus this time turned in the opposite direction in relation to the turning of the first-mentioned corner.

When the turning operation of the cuff is finished, the cuff can in a usual manner be provided with a stitch 13.

Collars having corners with an angle less than 90° can in a similar way be turned by means of this device.

The shown and described embodiment is to be regarded only as an example and the different details of the device may be constructively changed in many ways within the scope of the invention.

Instead of electrical, pneumatically operated implements could be used for the driving of the device and for the turning of the arm 16.

What I claim is:

A device for turning collars and cuffs formed of two pieces of fabric connected by a seam, comprising a stand, a stationary horizontal shaft mounted thereon, a hollow arm provided with ball bearings and turnably mounted on said shaft, an implement support rotatably carried by said arm, a tweezer-like implement mounted in said implement support, a triangular portion at the bottom of the tweezer-like implement, the lowest point of said triangular portion being in horizontal alignment with the aforesaid shaft, said tweezer-like implement consisting of two parts, two-armed lever beams mounted at the ends of said parts and being journaled on pins carried by the implement support, and a spring mounted between said parts, whereby to press the latter apart, two lever beams hinged together underneath said stand, a vertically slidable piston hinged to said last mentioned lever beams, guide means affixed to said stand, for reciprocably mounting said piston, and a mandrel formed with a triangular upper end affixed to the upper end of said piston, and a screw securing said mandrel to the piston.

References Cited in the file of this patent

UNITED STATES PATENTS 1,965,968    Roby et al. _____ July 10, 1934